US010316788B2

(12) United States Patent
Leone et al.

(10) Patent No.: US 10,316,788 B2
(45) Date of Patent: Jun. 11, 2019

(54) REDUCING ENGINE MISFIRE DUE TO CHARGE AIR COOLER CONDENSATE USING IN-CYLINDER ENRICHMENT AND A POSITIVE VALVE OVERLAP

(71) Applicant: Ford Global Technologies, LLC, Dearborn, MI (US)

(72) Inventors: Thomas G. Leone, Ypsilanti, MI (US); Gopichandra Surnilla, West Bloomfield, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 1491 days.

(21) Appl. No.: 13/779,359

(22) Filed: Feb. 27, 2013

(65) Prior Publication Data
US 2014/0244136 A1 Aug. 28, 2014

(51) Int. Cl.
| F02D 41/00 | (2006.01) |
| F02D 41/14 | (2006.01) |
| F02D 41/18 | (2006.01) |
| F02D 13/02 | (2006.01) |
| F02D 43/00 | (2006.01) |
| F02D 23/00 | (2006.01) |
| F02B 29/04 | (2006.01) |
| F02M 35/08 | (2006.01) |
| F02M 26/05 | (2016.01) |
| F02M 26/23 | (2016.01) |

(52) U.S. Cl.
CPC .......... *F02D 43/00* (2013.01); *F02B 29/0425* (2013.01); *F02B 29/0437* (2013.01); *F02D 13/0226* (2013.01); *F02D 13/0261* (2013.01); *F02D 23/00* (2013.01); *F02D 41/0007* (2013.01); *F02D 41/1454* (2013.01); *F02D 41/1475* (2013.01); *F02D 41/18* (2013.01); *F02M 26/05* (2016.02); *F02M 35/088* (2013.01); *F02D 2041/001* (2013.01); *F02D 2200/0418* (2013.01); *F02M 26/23* (2016.02); *Y02T 10/144* (2013.01); *Y02T 10/146* (2013.01); *Y02T 10/18* (2013.01)

(58) Field of Classification Search
USPC .................................................. 701/104–105
See application file for complete search history.

(56) References Cited

U.S. PATENT DOCUMENTS

| 5,848,529 A | 12/1998 | Katoh et al. |
| 7,275,516 B1 | 10/2007 | Cunningham et al. |
| 7,980,076 B2 * | 7/2011 | Buia et al. .................... 60/599 |

(Continued)

OTHER PUBLICATIONS

Stone, R. (2012). Spark Ignition Engines. In Introduction to Internal Combustion Engines (4th ed.). Palgrave Macmillan.*

(Continued)

*Primary Examiner* — Erick R Solis
*Assistant Examiner* — Anthony L Bacon
(74) *Attorney, Agent, or Firm* — Julia Voutyras; McCoy Russell LLP

(57) ABSTRACT

Methods and systems are provided for adjusting combustion parameters to increase combustion stability during conditions when condensate formed in a charge air cooler may enter cylinders of an engine. In response to increased mass air flow and a condensate level in the charge air cooler, the engine may combust a rich air-fuel ratio while increasing a positive valve overlap.

22 Claims, 5 Drawing Sheets

(56) References Cited

U.S. PATENT DOCUMENTS

| | | | |
|---|---|---|---|
| 8,365,528 B2* | 2/2013 | Leone et al. | 60/605.1 |
| 2005/0072406 A1 | 4/2005 | Cullen | |
| 2007/0056546 A1* | 3/2007 | Trask | F01L 9/04 |
| | | | 123/179.18 |
| 2009/0064677 A1* | 3/2009 | Farmer | 60/600 |
| 2010/0170460 A1* | 7/2010 | Leone et al. | 123/90.16 |
| 2010/0236532 A1 | 9/2010 | Xiao et al. | |
| 2010/0263639 A1* | 10/2010 | Uhrich et al. | 123/564 |
| 2010/0312451 A1* | 12/2010 | Karnik et al. | 701/102 |
| 2011/0209685 A1 | 9/2011 | Shane et al. | |
| 2011/0315101 A1* | 12/2011 | Cleary et al. | 123/90.15 |
| 2012/0316756 A1* | 12/2012 | Tsuyuki | 701/104 |
| 2013/0311068 A1* | 11/2013 | Rollinger | F02D 41/0065 |
| | | | 701/104 |
| 2014/0048050 A1* | 2/2014 | Pfab | 123/568.12 |
| 2014/0076289 A1* | 3/2014 | Ruona | F02B 29/0468 |
| | | | 123/542 |
| 2014/0157772 A1* | 6/2014 | Glugla | F02B 29/04 |
| | | | 60/599 |
| 2014/0158089 A1* | 6/2014 | Glugla | F02D 37/02 |
| | | | 123/403 |

OTHER PUBLICATIONS

State Intellectual Property Office of the People's Republic of China, Office Action and Search Report Issued in Application No. 201410068282.9, dated Jun. 1, 2017, 9 pages. (Submitted with Partial Translation).

* cited by examiner

REDUCING ENGINE MISFIRE DUE TO CHARGE AIR COOLER CONDENSATE USING IN-CYLINDER ENRICHMENT AND A POSITIVE VALVE OVERLAP

BACKGROUND

Summary

Turbocharged and supercharged engines may be configured to compress ambient air entering the engine in order to increase power. Compression of the air may cause an increase in air temperature, thus, a charge air cooler (CAC) may be utilized to cool the heated air thereby increasing its density and further increasing the potential power of the engine. Ambient air from outside the vehicle travels across the CAC to cool intake air passing through the inside of the CAC. Condensate may form in the CAC when the ambient air temperature decreases, or during humid or rainy weather conditions, where the intake air is cooled below the water dew point. Condensate may collect at the bottom of the CAC, or in the internal passages, and cooling turbulators. When torque is increased, such as during acceleration, increased mass air flow may strip the condensate from the CAC, drawing it into the engine and increasing the likelihood of engine misfire and/or combustion instability.

Other attempts to address engine misfire due to condensate ingestion involve avoiding condensate build-up. However, the inventors herein have recognized potential issues with such methods. Specifically, while some methods may reduce or slow condensate formation in the CAC, condensate may still build up over time. If this build-up cannot be stopped, ingestion of the condensate during acceleration may cause combustion instability and engine misfire.

Another method to prevent engine misfire due to condensate ingestion includes trapping and/or draining the condensate from the CAC. While this may reduce condensate levels in the CAC, condensate is moved to an alternate location or reservoir, which may be subject to other condensate problems such as freezing and corrosion.

In one example, the issues described above may be addressed by a method for adjusting combustion parameters to increase combustion stability during conditions of increased mass air flow when condensate is forming in the CAC. Specifically, during periods of increased mass air flow, when the condensate level in the CAC is above a threshold level, a rich air-fuel ratio may be combusted while also increasing a valve overlap of an intake and exhaust valve. In this way, combustion stability may be increased while condensate from the CAC enters the engine, thereby reducing the chance of engine misfire and/or unstable combustion.

As one example, a controller of an engine may decrease an air-fuel ratio and increase a valve overlap in response to a request to increase mass air flow over a threshold rate when the condensate level is greater than a threshold level. Decreasing the air-fuel ratio may include increasing an amount of fuel injected into an engine cylinder for combustion. Increasing the valve overlap may include increasing a duration that an intake valve and exhaust valve are opened at the same time. The valve overlap may be increased such that an exhaust gas mixture is maintained near stoichiometry during the combusting of the rich air-fuel ratio. The air-fuel ratio and valve overlap may be returned to base levels when one or more of the condensate level and/or the mass air flow decreases below respective thresholds.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
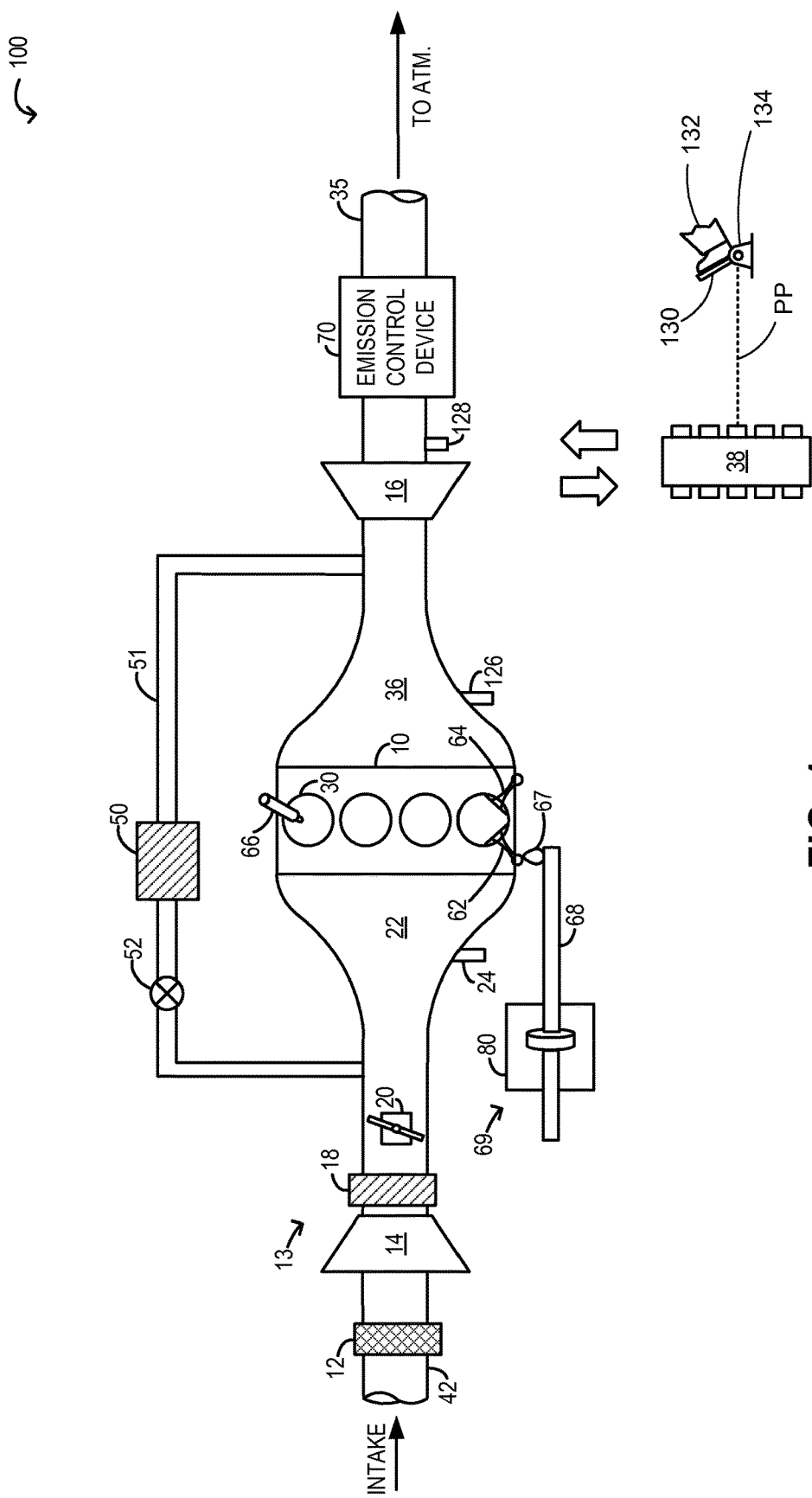
FIG. 1 is a schematic diagram of an example engine system including a charge air cooler.
Figure 2:
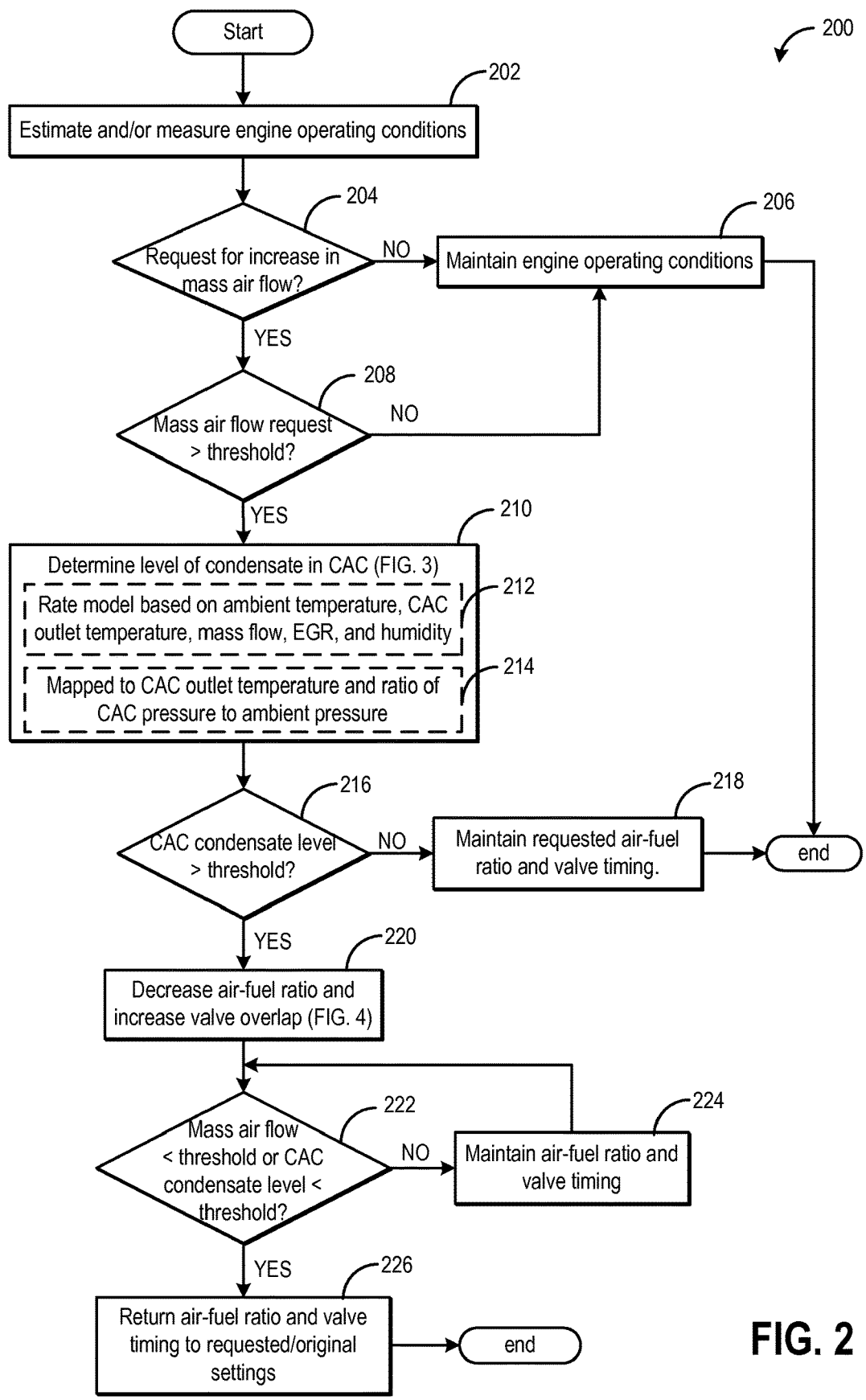
FIG. 2 shows a flow chart of a method for adjusting an air-fuel ratio and a valve timing responsive to a condensate level in a CAC and a mass air flow rate.
Figure 4:
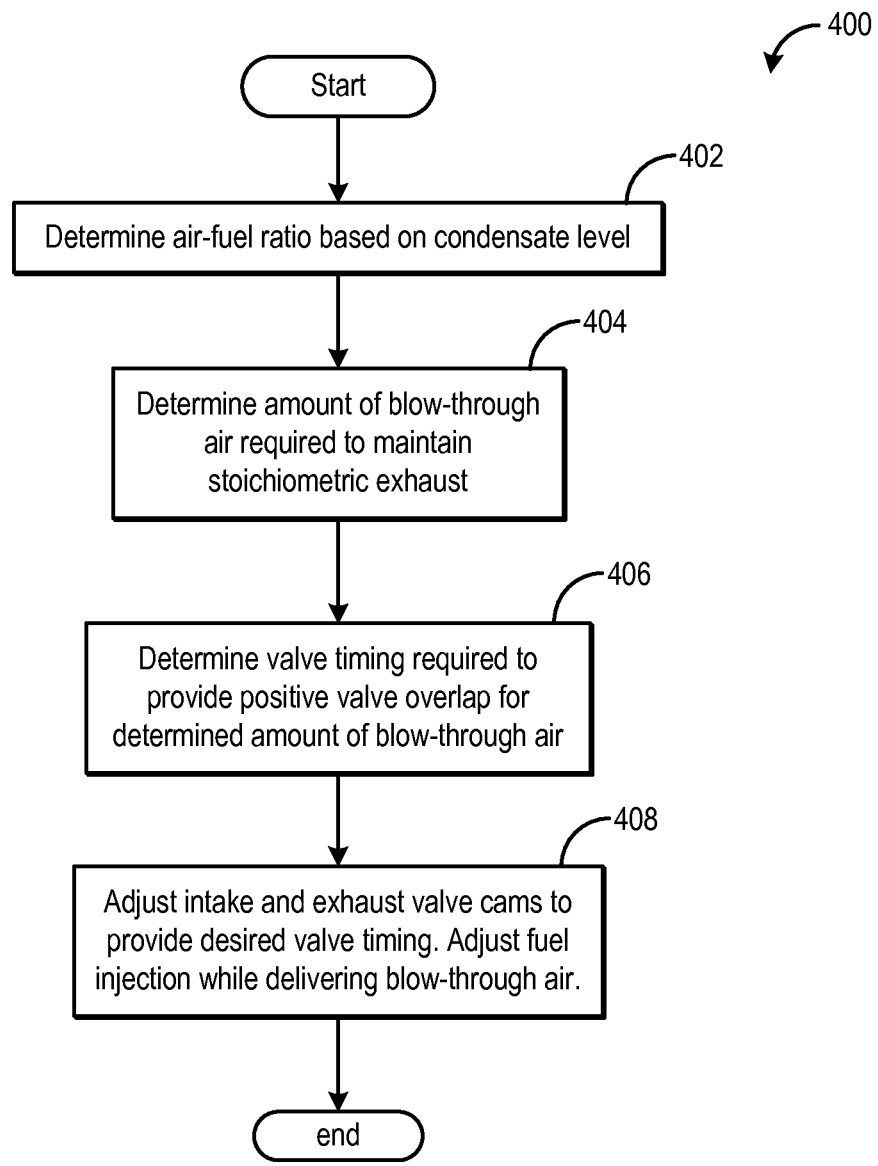
FIG. 4 shows a flow chart of a method for determining an air-fuel ratio and an amount of valve overlap based on a condensate level in a CAC and a mass air flow rate.
Figure 5:
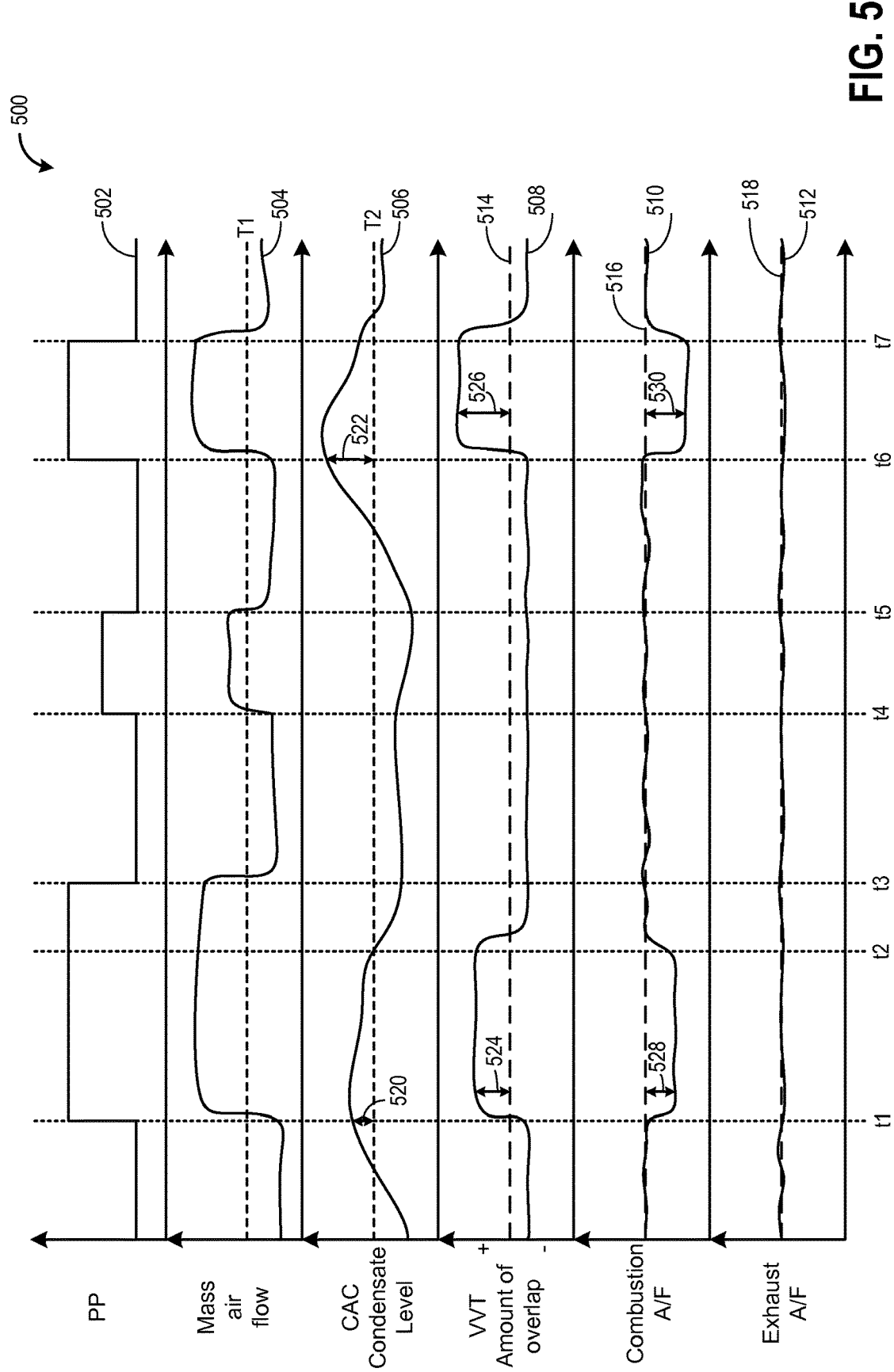
FIG. 5 shows a graphical example for adjusting an air-fuel ratio and a valve timing based on a condensate level in a CAC and a mass air flow rate.

The following description relates to systems and methods for adjusting combustion parameters to increase combustion stability during conditions when condensate formed in a charge air cooler (CAC) may enter an intake of engine system, such as the engine system shown in FIG. 1. During conditions of increased mass air flow, when a condensate level in the CAC is greater than a threshold level, an air-fuel ratio and valve timing may be adjusted to increase combustion stability. FIG. 2 presents an example method for determining when to decrease the air-fuel ratio and increase a valve overlap responsive to the condensate level and mass air flow rate. The level or amount of condensate in the CAC may be determined by a method presented at FIG. 3. Further, FIG. 4 shows an example method for determining the air-fuel ratio and amount of valve overlap, based on the condensate level and mass air flow rate. Finally, example air-fuel ratio and valve timing adjustments based on condensate level and mass air flow are shown at FIG. 5.

FIG. 1 schematically shows aspects of an example engine system 100 including an engine 10. In the depicted embodiment, engine 10 is a boosted engine coupled to a turbocharger 13 including a compressor 14 driven by a turbine 16. Specifically, fresh air is introduced along intake passage 42 into engine 10 via air cleaner 12 and flows to compressor 14. A flow rate of ambient air that enters the intake system through intake passage 42 can be controlled at least in part by adjusting throttle valve 20. Compressor 14 may be any suitable intake-air compressor, such as a motor-driven or driveshaft driven supercharger compressor. In engine system 10, however, the compressor is a turbocharger compressor mechanically coupled to turbine 16 via a shaft, the turbine 16 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed.

As shown in FIG. 1, compressor 14 is coupled, through a charge air cooler (CAC) 18 to throttle valve 20. The CAC may be an air-to-air or air-to-water heat exchanger, for example. Throttle valve 20 is coupled to engine intake manifold 22. From the compressor, the hot compressed air charge enters the inlet of the CAC 18, cools as it travels through the CAC, and then exits to pass through the throttle valve to the intake manifold. Ambient air flow from outside the vehicle may enter engine 10 through a grille at a vehicle front end and pass across the CAC, to aid in cooling the charge air. Condensate may form and accumulate in the CAC when the ambient air temperature decreases, or during humid or rainy weather conditions, where the charge air is cooled below the water dew point. When the charge air includes recirculated exhaust gasses, the condensate can become acidic and corrode the CAC housing. The corrosion can lead to leaks between the air charge, the atmosphere, and possibly the coolant in the case of water-to-air coolers. Additionally, condensate may collect at the bottom of the CAC, and then be drawn into the engine at once during periods of increased mass air flow, such as acceleration (or tip-in), increasing the chance of engine misfire. Thus, as elaborated herein with reference to FIGS. 2-5, combustion parameters such as air-fuel ratio and valve timing may be adjusted during periods of increased mass air flow such that combustion stability is increased and engine misfire events are reduced.

In the embodiment shown in FIG. 1, the pressure of the air charge within the intake manifold is sensed by manifold air pressure (MAP) sensor 24. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold section may enable effluent from different combustion chambers to be directed to different locations in the engine system.

Combustion chambers (e.g., cylinders) 30 may be supplied one or more fuels, such as gasoline, alcohol fuel blends, diesel, biodiesel, compressed natural gas, etc. Fuel may be supplied to the combustion chambers via fuel injector 66. In the depicted example, fuel injector 66 is configured for direct injection though in other embodiments, fuel injector 66 may be configured for port injection or throttle valve-body injection. Further, each combustion chamber may include one or more fuel injectors of different configurations to enable each cylinder to receive fuel via direct injection, port injection, throttle valve-body injection, or combinations thereof. In the combustion chambers, combustion may be initiated via spark ignition and/or compression ignition. An amount of fuel injected by fuel injector 66 into combustion chambers 30 may be adjusted to achieve a desired air-fuel ratio (A/F). In one example, the air-fuel ratio may be adjusted based on a condensate level in the CAC and/or a mass air flow rate (e.g., mass air flow). Methods for this adjustment are discussed further below with regard to FIGS. 2-5.

Exhaust from exhaust manifold 36 is directed to turbine 16 to drive the turbine. When reduced turbine torque is desired, some exhaust may be directed instead through a waste gate (not shown), by-passing the turbine. The combined flow from the turbine and the waste gate then flows through emission control device 70. In general, one or more emission control devices 70 may include one or more exhaust after-treatment catalysts configured to catalytically treat the exhaust flow, and thereby reduce an amount of one or more substances in the exhaust flow. For example, one exhaust after-treatment catalyst may be configured to trap NOx from the exhaust flow when the exhaust flow is lean, and to reduce the trapped NOx when the exhaust flow is rich. In other examples, an exhaust after-treatment catalyst may be configured to disproportionate NOx or to selectively reduce NOx with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regenerable soot filter configured to trap and oxidize soot particles in the exhaust flow. All or part of the treated exhaust from emission control device 70 may be released into the atmosphere via exhaust conduit 35. An exhaust gas sensor 128 is shown coupled to exhaust conduit 35 upstream of the emission control device 70. Sensor 128 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

Depending on operating conditions, a portion of exhaust may be recirculated from the exhaust manifold 36, upstream of turbine 16, to intake manifold 22, downstream of compressor 14 via EGR passage 51, through EGR cooler 50 and EGR valve 52. In this manner, high pressure exhaust gas recirculation (HP-EGR) may be enabled. In some embodiments, in addition to the HP-EGR, low pressure exhaust gas recirculation (LP-EGR) may also be enabled wherein a portion of treated exhaust is recirculated from the exhaust manifold 36, downstream of turbine 16, to intake manifold 22, upstream of compressor 14 via a low pressure EGR passage and therein coupled EGR cooler and EGR valve (not shown). EGR valve 52 may be opened to admit a controlled amount of cooled exhaust gas to the intake manifold for desirable combustion and emissions-control performance. The relatively long EGR flow path in engine system 10 provides excellent homogenization of the exhaust gas into the intake air charge. Further, the disposition of EGR take-off and mixing points provides very effective cooling of the exhaust gas for increased available EGR mass and improved performance.

Each combustion chamber (e.g., cylinder) 30 may be serviced by one or more valves. In the present example, each cylinder 30 includes a corresponding intake valve 62 and an exhaust valve 64. Engine system 100 further includes one or more camshafts 68 for operating intake valve 62 and/or exhaust valve 64. In the depicted example, intake camshaft 68 is coupled to intake valve 62 and can be actuated to operate intake valve 62. In some embodiments, where the intake valve of a plurality of cylinders 30 are coupled to a common camshaft, intake camshaft 68 can be actuated to operate the intake valves of all the coupled cylinders.

Intake valve 62 is actuatable between an open position that allows intake air into the corresponding cylinder and a closed position substantially blocking intake air from the cylinder. Intake camshaft 68 may be included in intake valve actuation system 69. Intake camshaft 68 includes intake cam 67 which has a cam lobe profile for opening intake valve 62 for a defined intake duration. In some embodiments (not shown), the camshaft may include additional intake cams with an alternate cam lobe profile that allows the intake valve 62 to be opened for an alternate duration (herein also referred to as a cam profile switching system). Based on the lobe profile of the additional cam, the alternate duration may be longer or shorter than the defined intake duration of intake cam 67. The lobe profile may affect cam lift height, cam duration, and/or cam timing. A controller may be able to switch the intake valve duration by moving intake camshaft 68 longitudinally and switching between cam profiles.

In the same manner, each exhaust valve 64 is actuatable between an open position allowing exhaust gas out of the corresponding cylinder and a closed position substantially retaining gas within the cylinder. It will be appreciated that while only intake valve 62 is shown to be cam-actuated, exhaust valve 64 may also be actuated by a similar exhaust camshaft (not shown). In some embodiments, where the exhaust valve of a plurality of cylinders 30 is coupled to a common camshaft, the exhaust camshaft can be actuated to operate the exhaust valves of all the coupled cylinders. As with intake camshaft 68, when included, the exhaust camshaft may include an exhaust cam having a cam lobe profile for opening exhaust valve 64 for a defined exhaust duration. In some embodiments, the exhaust camshaft may further include additional exhaust cams with an alternate cam lobe profile that allows exhaust valve 64 to be opened for an alternate duration. The lobe profile may affect cam lift height, cam duration, and/or cam timing. A controller may be able to switch the exhaust valve duration by moving the exhaust camshaft longitudinally and switching between cam profiles.

It will be appreciated that the intake and/or exhaust camshafts may be coupled to cylinder subsets, and multiple intake and/or exhaust camshafts may be present. For example, a first intake camshaft may be coupled to the intake valves of a first subset of cylinders while a second intake camshaft may be coupled to the intake valves of a second subset of cylinders. Likewise, a first exhaust camshaft may be coupled to the exhaust valves of a first subset of cylinders while a second exhaust camshaft may be coupled to the exhaust valves of a second subset of cylinders. Further still, one or more intake valves and exhaust valves may be coupled to each camshaft. The subset of cylinders coupled to the camshaft may be based on their position along an engine block, their firing order, the engine configuration, etc.

Intake valve actuation system 69 and exhaust valve actuation system (not shown) may further include push rods, rocker arms, tappets, etc. Such devices and features may control actuation of the intake valve 62 and the exhaust valve 64 by converting rotational motion of the cams into translational motion of the valves. As previously discussed, the valves can also be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders 30 may each have more than one exhaust valve and/or intake valve. In still other examples, each of the exhaust valve 64 and intake valve 62 of one or more cylinders may be actuated by a common camshaft. Further still, in some examples, some of the intake valves 62 and/or exhaust valves 64 may be actuated by their own independent camshaft or other device.

Engine system 100 may include variable valve timing (VVT) systems, for example, variable cam timing (VCT) system 80. A variable valve timing system may be configured to open an intake valve for a first duration and an exhaust valve for a second duration. The first and second duration may be based on engine operating conditions. In one example, the first and second durations may be adjusted based on mass air flow and a condensate level in the CAC.

VCT system 80 may be a twin independent variable camshaft timing system, for changing intake valve timing and exhaust valve timing independently of each other. VCT system 80 may include an intake camshaft phaser coupled to the common intake camshaft 68 for changing intake valve timing. The VCT system may likewise include an exhaust camshaft phaser coupled to a common exhaust camshaft for changing exhaust valve timing. VCT system 80 may be configured to advance or retard valve timing by advancing or retarding cam timing and may be controlled by controller 38. VCT system 80 may be configured to vary the timing of valve opening and closing events by varying the relationship between the crankshaft position and the camshaft position. For example, VCT system 80 may be configured to rotate intake camshaft 68 independently of the crankshaft to cause the valve timing to be advanced or retarded. In some embodiments, VCT system 80 may be a cam torque actuated device configured to rapidly vary the cam timing. In some embodiments, valve timing such as intake valve closing (IVC) and exhaust valve closing (EVC) may be varied by a continuously variable valve lift (CVVL) device.

The valve/cam control devices and systems described above may be hydraulically powered, or electrically actuated, or combinations thereof. In one example, a position of the camshaft may be changed via cam phase adjustment of an electrical actuator (e.g., an electrically actuated cam phaser) with a fidelity that exceeds that of most hydraulically operated cam phasers. Signal lines can send control signals to and receive a cam timing and/or cam selection measurement from VCT system 80.

By adjusting VCT system 80, a position of intake camshaft 68 can be adjusted to thereby vary an opening and/or closing timing of intake valve 62. As such, by varying the opening and closing of intake valve 62, an amount of positive valve overlap between intake valve 62 and exhaust valve 64 can be varied. For example, VCT system 80 may be adjusted to advance or retard an opening and/or a closing of intake valve 62 relative to a piston position.

During engine operation, a cylinder piston gradually moves downward from TDC, bottoming out at BDC by the end of the power stroke. The piston then returns to the top, at TDC, by the end of the exhaust stroke. The piston then again moves back down, towards BDC, during the intake stroke, returning to its original top position at TDC by the end of the compression stroke. During cylinder combustion, an exhaust valve may be opened just as the piston bottoms out at the end of the power stroke. The exhaust valve may then close as the piston completes the exhaust stroke, remaining open at least until a subsequent intake stroke has commenced. In the same way, an intake valve may be opened at or before the start of an intake stroke, and may remain open at least until a subsequent compression stroke has commenced.

Based on the timing differences between exhaust valve closing and intake valve opening, the valves may be operated with negative valve overlap wherein for a short duration after the end of the exhaust stroke and before the commencement of the intake stroke, both intake and exhaust valves are closed. This period, during which both valves are closed, is referred to as negative (intake to exhaust) valve overlap. In one example, the VCT system may be adjusted so that the negative intake to exhaust valve overlap timing may be a default cam position of the engine during cylinder combustion.

Alternatively, the valves may be operated with positive valve overlap wherein for a short duration before the end of the exhaust stroke and after the commencement of the intake stroke, both intake and exhaust valves may be open. This period, during which both valves may be open, is referred to as a positive (intake to exhaust) valve overlap. As elaborated herein, the VCT system 80 may be adjusted so that an amount of positive valve overlap during selected engine operating conditions is increased. Specifically, a position of the intake camshaft may be adjusted such that an opening of the intake valve timing is advanced. Consequently, the intake valve may be opened earlier, before the end of the exhaust stroke. As such, a duration over which both valves are open may be increased, thereby leading to increased positive valve overlap. As one example, positive valve overlap may be increased by moving the intake camshaft from a position of some positive valve overlap to a position having more positive valve overlap. As another example, positive valve overlap may be increased by moving the intake camshaft from a position of negative valve overlap to a position of positive valve overlap. In one example, the VCT system may be adjusted so that the negative intake to exhaust valve overlap timing may be a default cam position of the engine during an engine cold-start.

It will be appreciated that while the above example suggests increasing positive valve overlap by advancing intake opening timing, in alternate examples, positive valve overlap may be increased by adjusting an exhaust camshaft to retard exhaust valve closing. Further still, each of the intake and the exhaust camshafts may be adjusted to vary the positive valve overlap by varying both the intake and the exhaust valve timings.

FIG. 1 also shows a controller 38, which may be any electronic control system of the vehicle in which engine system 10 is installed. In embodiments where at least one intake or exhaust valve is configured to open and close according to an adjustable timing, the adjustable timing may be controlled via the electronic control system to regulate an amount of exhaust present in a combustion chamber during ignition. The electronic control system may also be configured to command the opening, closure and/or adjustment of various other electronically actuated valves in the engine system as needed to enact any of the control functions described herein. These valves may include throttle valves, compressor by-pass valves, waste gates, EGR valves and shut-off valves, various reservoir intake and exhaust valves, for example. The controller may also adjust the amount of fuel, as well as injection timing, of the fuel injectors. As such, the controller may adjust the VCT system and an air-fuel ratio. Further, to assess operating conditions in connection with the control functions of the engine system, the controller may be operatively coupled to a plurality of sensors arranged throughout the engine system. These may include flow sensors, temperature sensors, pedal-position sensors, pressure sensors, a mass air flow sensor, etc. Specifically, a pedal position sensor 134 is shown coupled to an accelerator pedal 130 for sensing force applied by vehicle operator 132. The controller 38 may use data from these various sensors to estimate other engine operating conditions. For example, as discussed with regard to FIGS. 2-3 further below, the controller 38 may estimate condensate level in the CAC.

As described above, FIG. 1 shows a non-limiting example of an internal combustion engine. It should be understood that in some embodiments, the engine may have more or less combustion cylinders, control valves, throttles, and compression devices, among others. Example engines may have cylinders arranged in a "V" configuration. Further, a common intake camshaft may control the intake valves for a first set of cylinders on a first bank while a second intake camshaft may control the intake valves for a second set of cylinders on a second bank. That is, a common camshaft of a cam actuation system (e.g., a VCT system) may be used to control valve operation of a group of cylinders.

In the engine system described above, during periods of increased mass air flow, airflow through the CAC may increase. If the mass air flow increases to a high enough level, increased airflow through the CAC may strip the condensate from the CAC and force it to enter the cylinders of the engine. Combustion instability and engine misfire may occur if enough condensate enters the engine cylinders at once. Thus, there may be a threshold rate of mass air flow that evacuates (e.g., purges) condensate from the CAC to the intake of the engine. Similarly, there may be a threshold level of condensate that may cause engine misfire and/or unstable combustion if it is ingested by the engine. Increased mass air flow may occur in response to an increase in torque demand, such as a tip-in. A tip-in may be indicated by an increase in pedal position and/or an increase in an opening of a throttle. Thus, in one example, mass air flow may increase during an acceleration event.

Combustion stability may be increased during condensate purging by adjusting combustion parameters. Combustion parameters may include an air-fuel ratio and a valve timing. In one example, fuel injection may be enriched to increase combustion stability. Enriching fuel injection includes increasing an amount of fuel injected into the cylinders for combustion, thereby decreasing an air-fuel ratio. The amount of increase in fuel injected may be based on the amount of condensate in the CAC. For example, for a larger amount of condensate, a smaller air-fuel ratio and therefore larger amount of fuel injected into the cylinder may be required for stable combustion. The amount of increase in fuel injected may be further based on the mass air flow request. For example, if the mass air flow increases to a higher rate, the air-fuel ratio may decrease to a lower level for stable combustion.

In order to maintain an exhaust gas mixture near stoichiometry, an amount of compressed intake air, herein referred to as blow-through air or gas, may be directed from the intake manifold to the exhaust manifold. An amount of blow-through air may increase for decreasing air-fuel ratio. Blow-through air may be created by increasing a positive valve overlap of an intake valve and an exhaust valve. As discussed above, a positive valve overlap is created when the intake and exhaust valves are both open at the same time. Thus, air may travel through the intake valve, into the combustion cylinder, and out the exhaust valve. An amount of blow-through air may be increased by increasing the amount of positive valve overlap. In one example, to provide a desired amount of blow-through air through the engine cylinders, the VCT system may be adjusted from a first position having no positive valve overlap to a second position having increased positive valve overlap. In another example, the VCT system may be adjusted from a first position having some positive valve overlap to a second position having more positive valve overlap. Increasing positive valve overlap also increases combustion stability by flushing residual exhaust gas from the cylinders. Thus, positive valve overlap may be used to increase combustion stability during condensate purging and maintain the exhaust gas near stoichiometry.

Combusting the rich air-fuel ratio and setting the valve timing at an increased positive valve overlap may continue until either one or more of the mass air flow decreases below the threshold rate and/or the condensate level in the CAC decreases below the threshold level. When one or both of these events occur, condensate may no longer enter the combustion cylinders. Thus, decreasing the air-fuel ratio and increasing the positive valve overlap for increased combustion stability may no longer be needed. As such, in response to the condensate level decreasing below the threshold level and/or the mass air flow decreasing below the threshold rate, the controller may return the air-fuel ratio and positive valve overlap to base or currently requested levels. This may include returning the VCT and/or fuel injection amount to pre-set levels.

In this way, the system of FIG. 1 enables a method for combusting a rich air-fuel ratio and adjusting valve timing to increase a positive valve overlap in response to an increase in mass air flow. The combusting the rich air-fuel ratio and adjusting valve timing may be further based on a condensate level in a CAC. Further, combusting the rich air-fuel ratio and adjusting valve timing to create the positive valve overlap may be responsive to a request to increase mass air flow over a threshold rate when the condensate level is greater than a threshold level. In one example, combusting the rich air-fuel ratio includes increasing an amount of fuel injected into an engine cylinder. An amount of increase in the amount of fuel injected may be based on one or more of the condensate level and the mass air flow. The method may further comprise increasing the positive valve overlap of an intake valve and an exhaust valve to maintain an exhaust gas mixture near stoichiometry during the combusting the rich air-fuel ratio. The increasing the positive valve overlap may include increasing a duration over which both the intake valve and the exhaust valve are open. For example, increasing the duration over which both the intake vale and exhaust valve are open may include one or more of advancing opening of the intake valve and retarding closing of the exhaust valve. The method may further comprise increasing an air-fuel ratio from the rich air-fuel ratio and decreasing the positive valve overlap in response to one or more of a decrease in mass air flow below a threshold rate and a decrease in the condensate level below a threshold level. Further details on these methods are presented below with reference to FIGS. 2-5.

FIG. 2 shows a flow chart of a method 200 for adjusting an air-fuel ratio and a valve timing responsive to a condensate level in a CAC and a mass air flow rate. A controller, such as controller 38 shown in FIG. 1, may have instructions stored thereon for executing method 200. Method 200 begins a 202 by estimating and or measuring engine operating conditions. Engine operating conditions may include engine speed and load, vehicle speed, pedal position (PP), throttle position, CAC temperature and pressure, engine temperature, mass air flow rate, air-fuel ratio, VVT, etc. The method at 204 includes determining if there is a request to increase mass air flow. In one example, an increase in mass air flow may be responsive to a tip-in. The tip-in may be indicated by an increase in pedal position (PP) and/or an increase in throttle opening. If there is not a request to increase mass air flow, the method continues on to 206 to maintain engine operating conditions (including valve timing and air-fuel ratio). However, if there is a request to increase mass air flow, the method continues on to 208 to determine if the mass air flow request will increase mass air flow greater than a threshold. This threshold may be a threshold rate or level of mass air flow. If the mass air flow request is not greater than the threshold rate, the controller maintains engine operating conditions at 206. However, if the mass air flow increases or will increase (due to the request) over the threshold rate, the method continues on to 210.

At 210, the method may determine the level of condensate in the CAC, based on engine operating conditions. In one example, at 212, and as further elaborated at the model at FIG. 3, a rate of condensate formation within the CAC may be based on ambient temperature, CAC outlet temperature, air mass flow, EGR, and humidity. This may then be used to calculate the amount or level of condensate in the CAC. In another example, at 214, a condensation formation value may be mapped to CAC outlet temperature and a ratio of CAC pressure to ambient pressure. In an alternate example, the condensation formation value may be mapped to CAC outlet temperature and engine load. Engine load may be a function of air mass, torque, accelerator pedal position, and throttle position, and thus may provide an indication of the air flow velocity through the CAC. For example, a moderate engine load combined with a relatively cool CAC outlet temperature may indicate a high condensation formation value, due to the cool surfaces of the CAC and relatively low intake air flow velocity. The map may further include a modifier for ambient temperature.

Returning to FIG. 2, at 216, the method determines if the CAC condensate level (e.g., amount of condensate in the CAC) is above a threshold level. As described above, the threshold level may be based on an amount of condensate that may cause engine misfire or unstable combustion if ingested at once by the engine. If the CAC condensate level is not greater than the threshold level, the controller may maintain the requested or pre-set air-fuel ratio and valve timing (e.g., VVT) at 218. However, if the condensate level in the CAC is greater than the threshold level, the method continues on to 220 to decrease the air-fuel ratio and increase the positive valve overlap of the intake an exhaust valves. Details on determining the air-fuel ratio and positive valve overlap, and making the corresponding adjustments to fuel injection and VVT systems are presented at FIG. 4.

At 222, the method determines if mass air flow has decreased below the threshold rate and/or the CAC condensate level has decreased below the threshold level. If neither of these conditions are met, the controller maintains the decreased air-fuel ratio and valve timing adjustments at 224. When one or more of the conditions at 222 are met, the controller may return the air-fuel ratio and valve timing to currently requested or original (e.g., pre-set) settings. Thus, the conditions at 222 may indicate that increased combustion stability is no longer needed.

Figure 3:
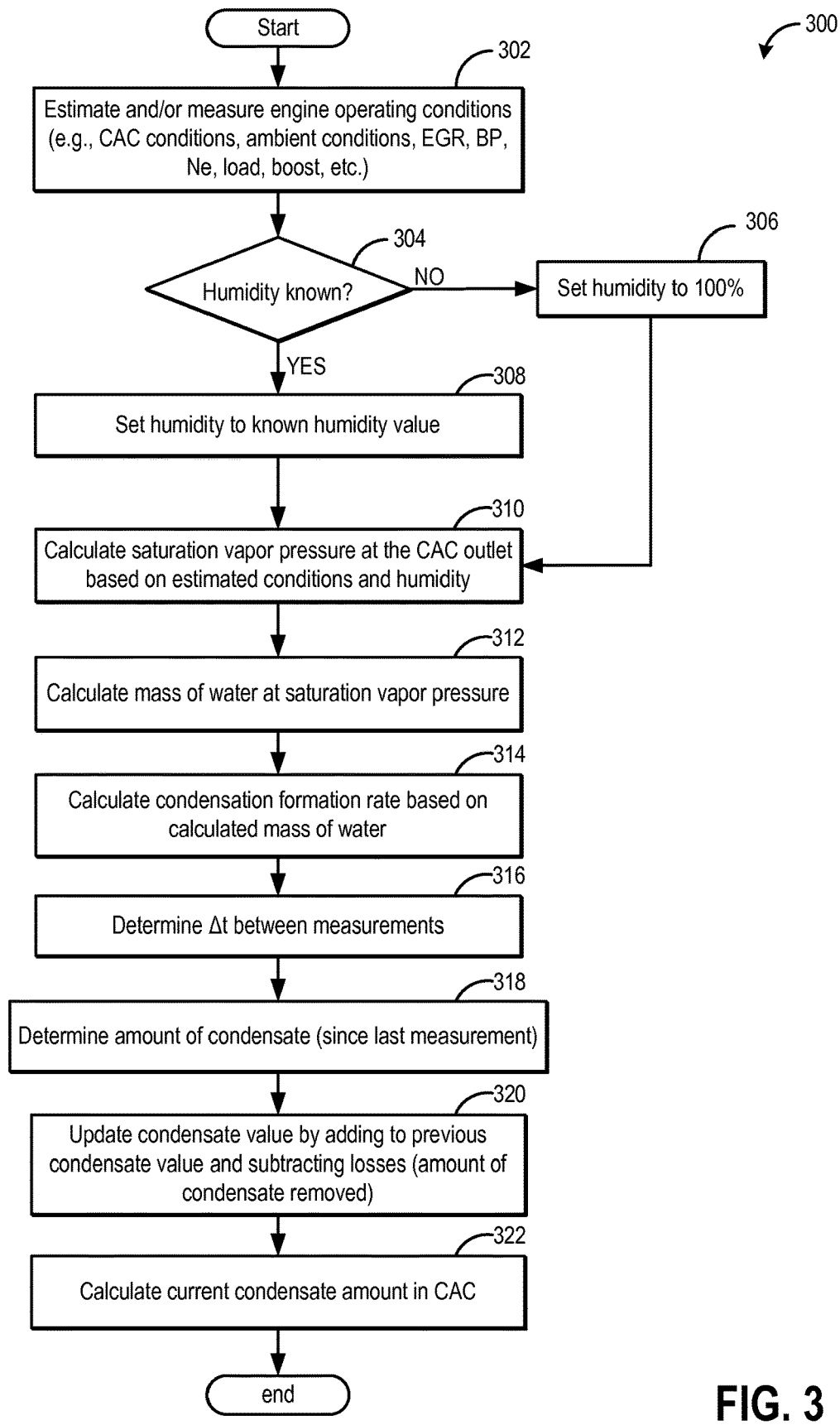
FIG. 3 shows a flow chart illustrating a method for determining the amount of condensate within a CAC according to an embodiment of the present disclosure.

FIG. 3 illustrates a method 300 for estimating the amount of condensate stored within a CAC. Based on the amount of condensate at the CAC relative to a threshold value, an air-fuel ratio and valve timing may be adjusted during periods of increased mass air flow with the methods shown at FIG. 2 and FIG. 4.

The method begins at 302 by determining the engine operating conditions. These may include, as elaborated previously at 202, ambient conditions, CAC conditions (inlet and outlet temperatures and pressures, flow rate through the CAC, etc.), mass air flow, MAP, EGR flow, engine speed and load, engine temperature, boost, etc. Next, at 304, the routine determines if the ambient humidity (humidity) is known. In one example, the ambient humidity may be known based on the output of a humidity sensor coupled to the engine. In another example, humidity may be inferred from a downstream UEGO sensor or obtained from infotronics (e.g., internet connections, a vehicle navigation system, etc.) or a rain/wiper sensor signal. If the humidity is not known (for example, if the engine does not include a humidity sensor), the humidity may be set at 306 to 100%. In an alternate embodiment, the humidity may be estimated based on inferred conditions, such as CAC efficiency and windshield wiper speed. However, if the humidity is known, the known humidity value, as provided by the humidity sensor, may be used as the humidity setting at 308.

The ambient temperature, pressure, and humidity may be used to determine the dew point of the intake air, which may be further affected by the amount of EGR in the intake air (e.g., EGR may have a different humidity and temperature than the air from the atmosphere). The difference between the dew point, the pressure at CAC outlet, and the CAC outlet temperature indicates whether condensation will form within the cooler, and the mass air flow may affect how much condensation actually accumulates within the cooler. At 310, an algorithm may calculate the saturation vapor pressure at the CAC outlet as a function of the CAC outlet temperature and pressure. The algorithm then calculates the mass of water at this saturation vapor pressure at 312. Finally, the condensation formation rate at the CAC outlet is determined at 314 by subtracting the mass of water at the saturation vapor pressure condition at the CAC outlet from the mass of water in the ambient air. By determining the amount of time between condensate measurements at 316, method 300 may determine the amount of condensate within the CAC since a last measurement at 318. The current condensate amount in the CAC is calculated at 322 by adding the condensate value estimated at 318 to the previous condensate value and then subtracting any condensate losses since the last routine (that is, an amount of condensate removed. for example, via purging routines) at 320. Condensate losses may be assumed to be zero if the CAC outlet temperature was above the dew point. Alternatively, at 320, the amount of condensate removed may be modeled or determined empirically as a function of air mass and integrated down with each software task loop (that is, with each run of routine 300).

FIG. 4 shows a flow chart of a method 400 for determining an air-fuel ratio and an amount of valve overlap based on a condensate level in a CAC and a mass air flow rate. The method begins at 402 by determining the air-fuel ratio based on the condensate level determined at 210 in method 200. For example, based on the amount the CAC condensate level is above the threshold level, the controller may determine the decreased air-fuel ratio. In one example, the air-fuel ratio may decrease with increasing condensate level. Determining the air-fuel ratio may include determining an amount of fuel injected into the engine cylinders for combustion. In order to decrease the air-fuel ratio, the amount of fuel injected into the cylinders may increase. Thus, an amount of increase in the amount of fuel injected may be based on one or more of the condensate level and the mass air flow. For example, more fuel may be injected, thereby decreasing the air-fuel ratio, to increase combustion stability at higher condensate and mass air flow levels. In this way, the amount of fuel injected into the cylinders may increase for increasing condensate level and mass air flow rates.

Returning to 402, after the controller determines the new air-fuel ratio, the method continues on to 404 to determine an amount of blow-through air required to maintain the exhaust gas near stoichiometry. A stoichiometric exhaust gas mixture may be an exhaust gas mixture which contains no unburned fuel. As such, as an air-fuel ratio decreases, a larger amount of blow-through air may be needed in order to burn all the injected fuel during combustion. Thus, at 404, the controller may determine an amount of blow-through air required to maintain a stoichiometric exhaust for the decreased air-fuel ratio determined at 402.

At 406, the controller determines the valve timing required to provide a positive valve overlap for the determined amount of blow-through air. In one example, providing the positive valve overlap may include increasing the positive valve overlap from a negative valve overlap or no positive valve overlap to some positive valve overlap. In another example, providing the positive valve overlap may include increasing the positive valve overlap from some positive valve overlap to more positive valve overlap. Increasing the positive valve overlap may include increasing a duration over which both an intake valve and an exhaust valve of the engine are open. In this way, more blow-through air may be provided for a longer duration in which the intake and exhaust valves are open together. In one example, increasing the duration over which both the intake vale and exhaust valve are open includes advancing opening of the intake valve and/or retarding closing of the exhaust valve.

Adjusting the opening and closing of the intake and exhaust valves may be controlled by a variable valve timing system such as the variable cam timing (VCT) system described above. At 408, the method includes adjusting the intake and exhaust cams of the VCT system to provide the valve timing determined at 406. The controller may also adjust the fuel injection to deliver the determine air-fuel ratio while delivering the blow-through air.

In this way, an air-fuel ratio may be decreased and a positive valve overlap of an intake valve and an exhaust valve may be increased in response to a mass air flow over a threshold rate and a condensate level in a charge air cooler greater than a threshold level. Decreasing the air-fuel ratio may include decreasing the air-fuel ratio from a first ratio to a second ratio, the second ratio decreasing with increasing condensate level. Increasing the positive valve overlap may include increasing the positive valve overlap from a first level to a second level, the second level based on an amount of blow-through air required to maintain the air-fuel ratio of an exhaust gas mixture near stoichiometry. The amount of blow-through air may increase with decreasing second ratio. Further, increasing the positive valve overlap from the first level to the second level may include adjusting a variable cam timing system from a first position having no positive valve overlap to a second position having increased positive valve overlap. In one example, increasing the positive valve overlap from the first level to the second level includes adjusting a variable cam timing system from a first position having some positive valve overlap to a second position having more positive valve overlap than the first position. When increased combustion stability is no longer needed, the method may further include increasing the air-fuel ratio from the second ratio to the first ratio and decreasing the valve overlap from the second level to the first level in response to one or more of the condensate level decreasing below the threshold level and the mass air flow decreasing below the threshold rate.

FIG. 5 shows a graphical example for adjusting an air-fuel ratio and a valve timing based on a condensate level in a CAC and a mass air flow rate. Specifically, graph 500 illustrates changes in pedal position (PP) at plot 502, changes in mass air flow at plot 504, changes in CAC condensate level at plot 506, changes in the amount of valve overlap of a VVT system at plot 508, changes in a combustion air-fuel ratio at plot 510, and changes in an exhaust gas air-fuel ratio at plot 512. At plot 508, the amount of valve overlap is shown relative to a line 514 which denotes no overlap (e.g., intake and exhaust valve are not open at the same time). Any amount of overlap above line 514 reflects a positive valve overlap while any amount of overlap below line 514 reflects a negative valve overlap. The adjustments to air-fuel ratio in response to condensate level and mass air flow may be adjustments to a combustion air-fuel ratio. As shown at plot 510, an air-fuel ratio less than a stoichiometric ratio 516 may be a rich air-fuel ratio (e.g., lower air-fuel ratio). As shown at plot 512, the air-fuel ratio of the exhaust gas may be maintained near a stoichiometric ratio 518.

Before time t1, mass air flow is below a threshold rate, T1 (plot 504), and CAC condensate level is below a threshold level, T2 (plot 506). VVT may be set such that there is a negative amount of valve overlap (plot 508). Additionally, the combustion and exhaust air-fuel ratios may be around their respective stoichiometric ratios 516 and 518 (plots 510 and 512). Just before time t1, the condensate level in the CAC increases above the threshold level T2. At time t1, a tip-in may occur, as indicated by an increase in pedal position (plot 502). In response, mass air flow increases above the threshold rate T1 (plot 504). Responsive to the increase in mass air flow above the threshold rate T1 and the increase in condensate level above the threshold level T2, the controller decreases the air-fuel ratio. The amount of decrease 528 in air-fuel ratio is based on the amount of increase 520 in CAC condensate level above the threshold level T2. Additionally, in response to the increase in mass air flow above the threshold rate T1 and the increase in condensate level above the threshold level T2 at time t1, the controller increases the amount of valve overlap (plot 508). The amount of increase 524 in positive valve overlap may be based on the amount of decrease 528 in combustion air-fuel ratio. The amount of increase 524 in positive valve overlap provides enough blow-through air to maintain the exhaust air-fuel ratio near the stoichiometric ratio 518 (plot 512).

At time t2, the CAC condensate level decreases below the threshold level T2. As a result, the WT and combustion air-fuel ratio are returned to pre-set or requested levels. At time t3, the tip-in ends and mass air flow decreases below the threshold rate T1. At time t4, another increase in pedal position occurs. Air mass flow increases above the threshold rate T1 (plot 504); however, the CAC condensate level is below the threshold level T2. Thus, valve timing and the air-fuel ratio are maintained at time t4. Mass air flow decreases below the threshold rate T1 at time t5 as pedal position decreases.

Between time t5 and time t6, the CAC condensate level increases above the threshold level T2. At time t6, a tip-in occurs, as denoted by the increase in pedal position (plot 502). As a result, mass air flow increases above the threshold rate T1 (plot 504). In response to the increase in mass air flow above the threshold rate T1 when the condensate level is above the threshold level T2, the controller increase the positive valve overlap (plot 508) and decreases the combustion air-fuel ratio (plot 510). The amount of increase 522 in CAC condensate level is greater at time t6 than the amount of increase 520 in CAC condensate level at time t1. As such, the amount of decrease 530 in air-fuel ratio at time t6 is larger than the amount of decrease 528 in air-fuel ratio at time t1. This also results in the amount of increase 526 in positive valve overlap at time t6 to be larger than the amount of increase 524 in positive valve overlap at time t1. The amount of blow-through air provided at time t6 maintains the exhaust air-fuel ratio at the stoichiometric ratio 518. At time t7, the tip-in ends and mass air flow decreases below the threshold rate T1 (plot 504). In response, VVT and combustion air-fuel ratio are returned to their currently requested or pre-set values.

In one example, during a first condition (as shown at time t1 and time t6), when the mass air flow is greater than the threshold rate and the condensate level in the CAC is greater than the threshold level, the controller decreases the air-fuel ratio (e.g., combustion air-fuel ratio) and increases the positive valve overlap. In another example, during a second condition (as shown at time t4), when one or more of the mass air flow is less than the threshold rate and the condensate level is less than the threshold level, the controller maintains the air-fuel ratio and the positive valve overlap. As described above, increasing the positive valve overlap, as shown at time t1 and time t6, may include one or more of advancing opening of an intake valve and retarding closing of an exhaust valve. As shown at time t6, the decreasing the air-fuel ratio increases with increasing condensate level in the CAC. Similarly, the increasing the positive valve overlap increases with decreasing air-fuel ratio and increasing condensate level in the CAC. In one example, as shown at time t7, the air-fuel ratio and the positive valve overlap are returned to respective base levels in response to the mass air flow decreasing below the threshold rate. In another example, as shown at time t2, the air-fuel ratio and the positive valve overlap are returned to respective base levels in response to the condensate level decreasing below the threshold level.

In this way, combustion stability may be increased in response to increased mass air flow when condensate level in a CAC is greater than a threshold level. Specifically, combusting a rich air-fuel ratio may increase combustion stability during conditions when CAC condensate may be ingested by the engine. Adjusting valve timing to increase an amount of positive valve overlap may increase the amount of blow-through air traveling through the engine cylinders during the period of combusting the rich air-fuel ratio. The increase in the amount of blow-through air may maintain an exhaust gas mixture near stoichiometry. Additionally, increasing the amount of positive valve overlap may further increase combustion stability. In this way, combustion stability may be increased during periods of potential condensate ingestion, thereby decreasing engine misfire events.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and sub-combinations of the various systems and configurations, and other features, functions, and/or properties disclosed herein.

The invention claimed is:

1. An engine method, comprising:
   forming and combusting a rich air-fuel ratio in cylinders of an engine and adjusting valve timing to increase a positive valve overlap from a less positive valve overlap in response to an increase in mass air flow, wherein forming and combusting the rich air-fuel ratio and adjusting valve timing is further in response to a condensate level in a charge air cooler being greater than a threshold, and wherein increasing the positive valve overlap provides at least some positive valve overlap, wherein the threshold is a threshold amount of condensate that causes a misfire or unstable combustion.

2. The method of claim 1, wherein the increase in mass air flow is based on a tip-in.

3. The method of claim 1, wherein forming and combusting the rich air-fuel ratio and adjusting valve timing to increase the positive valve overlap is responsive to a request to increase mass air flow over a threshold rate when the condensate level is greater than the threshold.

4. The method of claim 3, wherein forming and combusting the rich air-fuel ratio includes increasing an amount of fuel injected into an engine cylinder.

5. The method of claim 4, wherein an amount of increase in the amount of fuel injected is based on each of the condensate level and the mass air flow.

6. The method of claim 3, further comprising increasing the positive valve overlap of an intake valve and an exhaust valve to maintain an exhaust gas mixture near stoichiometry during the forming and combusting the rich air-fuel ratio.

7. The method of claim 6, wherein increasing the positive valve overlap includes increasing a duration over which both the intake valve and the exhaust valve are open.

8. The method of claim 7, wherein increasing the duration over which both the intake valve and the exhaust valve are open includes one or more of advancing opening of the intake valve and retarding closing of the exhaust valve.

9. The method of claim 1, further comprising increasing an air-fuel ratio from the rich air-fuel ratio and decreasing the positive valve overlap from the increased positive valve overlap in response to each of a decrease in the mass air flow below a threshold rate and a decrease in the condensate level below the threshold.

10. An engine method, comprising:
    decreasing an air-fuel ratio formed in cylinders of an engine and increasing a positive valve overlap of an intake valve and an exhaust valve from a less positive valve overlap in response to a mass air flow over a threshold rate and a condensate level in a charge air cooler greater than a threshold level, where increasing the positive valve overlap provides at least some positive valve overlap, wherein the threshold level is a threshold amount of condensate that causes a misfire or unstable combustion; and
    maintaining the air-fuel ratio and providing negative valve overlap responsive to the condensate level below the threshold level but the mass air flow over the threshold rate.

11. The method of claim 10, wherein the decreasing includes decreasing the air-fuel ratio from a first ratio to a second ratio, the second ratio decreasing with increasing condensate level.

12. The method of claim 11, wherein increasing the positive valve overlap includes increasing the positive valve overlap from the less positive valve overlap includes increasing the positive valve overlap from a first level to a second level, the second level based on an amount of blow-through air required to maintain the air-fuel ratio of an exhaust gas mixture near stoichiometry.

13. The method of claim 12, wherein the amount of blow-through air increases with decreasing of the second ratio.

14. The method of claim 12, wherein increasing the positive valve overlap from the first level to the second level includes adjusting a variable cam timing system from a first position having no positive valve overlap to a second position having increased positive valve overlap.

15. The method of claim 12, wherein increasing the positive valve overlap from the first level to the second level includes adjusting a variable cam timing system from a first position having some positive valve overlap to a second position having more positive valve overlap than the first position.

16. The method of claim 12, further comprising increasing the air-fuel ratio from the second ratio to the first ratio and decreasing the positive valve overlap from the second level to the first level in response to one or more of the condensate level decreasing below the threshold level and the mass air flow decreasing below the threshold rate.

17. An engine method, comprising:
    during a first condition, responsive to a mass air flow greater than a threshold rate and a condensate level in a charge air cooler greater than a threshold level, decreasing a combustion air-fuel ratio formed in cylinders of an engine and increasing a positive valve overlap from a less positive valve overlap, where increasing the positive valve overlap provides at least some positive valve overlap, wherein the threshold level is a threshold amount of condensate that causes a misfire or unstable combustion; and
    during a second condition, responsive to the condensate level less than the threshold level but the mass air flow greater than the threshold rate, maintaining the air-fuel ratio and providing negative valve overlap.

18. The method of claim 17, wherein increasing the positive valve overlap includes one or more of advancing opening of an intake valve and retarding closing of an exhaust valve.

19. The method of claim 17, wherein an amount of the decreasing of the air-fuel ratio increases with increasing condensate level in the charge air cooler.

20. The method of claim 19, wherein an amount of increasing of the positive valve overlap increases with increasing condensate level in the charge air cooler, wherein, during both the first and second conditions, exhaust air-fuel ratio is maintained at a stoichiometric air-fuel ratio.

21. The method of claim 17, further comprising, during the first condition, returning the air-fuel ratio and the positive valve overlap to respective base levels in response to the mass air flow decreasing below the threshold rate.

22. The method of claim 17, further comprising, during the first condition, returning the air-fuel ratio and the positive valve overlap to respective base levels in response to the condensate level decreasing below the threshold level, the condensate level estimated based on operating conditions.

* * * * *